United States Patent
Shibata

(10) Patent No.: US 8,908,468 B2
(45) Date of Patent: Dec. 9, 2014

(54) WIRELESS REMOTE SENSING SYSTEM USING SURFACE ACOUSTIC WAVE SENSOR

(71) Applicant: DENSO Corporation, Aichi-pref. (JP)

(72) Inventor: Takayuki Shibata, Nisshin (JP)

(73) Assignee: DENSO Corporation, Kariya (JP)

( * ) Notice: Subject to any disclaimer, the term of this patent is extended or adjusted under 35 U.S.C. 154(b) by 303 days.

(21) Appl. No.: 13/625,040

(22) Filed: Sep. 24, 2012

(65) Prior Publication Data

US 2013/0077666 A1 Mar. 28, 2013

(30) Foreign Application Priority Data

Sep. 28, 2011 (JP) ................................. 2011-212516

(51) Int. Cl.
*H04B 17/00* (2006.01)
*G01K 11/26* (2006.01)

(52) U.S. Cl.
CPC ................................... *G01K 11/265* (2013.01)
USPC ........................................................... 367/2

(58) Field of Classification Search
CPC .............................. G01K 11/265; G01S 15/74
USPC .............................................. 367/2; 375/224
See application file for complete search history.

(56) References Cited

U.S. PATENT DOCUMENTS 6,747,573 B1 6/2004 Gerlach et al.
2013/0077666 A1* 3/2013 Shibata ........................ 375/224

FOREIGN PATENT DOCUMENTS

| JP | A-2005-092490 | 4/2005 |
| JP | 2007-304087 A | 11/2007 |
| JP | 2008-151520 A | 7/2008 |
| JP | 2010-261840 A | 11/2010 |
| JP | 2010-287244 A | 12/2010 |

* cited by examiner

*Primary Examiner* — Daniel Pihulic
(74) *Attorney, Agent, or Firm* — Posz Law Group, PLC

(57) ABSTRACT

In an ON state, a first switch generates a transmission signal by pulse modulating a carrier. A SAW sensor outputs a reception signal after a delay from receipt of the transmission signal. In an input state, a second switch receives and transmits the transmission signal to the SAW sensor. In an output state, the second switch receives and outputs the reception signal. A SAW delay element outputs a local signal after the delay from receipt of the transmission signal. A mixer generates a synchronous detection signal by mixing the reception and local signals. During the input state of the second switch, the first switch switches from the OFF state, to the ON state, and back to the OFF state. The second switch switches from the input state to the output state before the delay after the first switch switches back to the OFF state.

6 Claims, 12 Drawing Sheets

WIRELESS REMOTE SENSING SYSTEM USING SURFACE ACOUSTIC WAVE SENSOR

CROSS REFERENCE TO RELATED APPLICATION

This application is based on Japanese Patent Application No. 2011-212516 filed on Sep. 28, 2011, the disclosure of which is incorporated herein by reference.

TECHNICAL FIELD

The present disclosure relates to a wireless remote sensing system including a surface acoustic wave sensor and a sensing apparatus.

BACKGROUND

For example, as disclosed in JP-A-2005-92490, a wireless remote sensing system using a surface acoustic wave (SAW) sensor is known. A system disclosed in JP-A-2005-92490 includes a SAW sensor and a sensing apparatus. In the sensing apparatus, a mixer mixes a carrier wave, having a predetermined frequency, outputted from an oscillator with a pulse signal outputted from a pulse generator by a mixer. Thus, the carrier wave is pulse-modulated so that a transmission signal can be generated. The transmission signal is amplified by an amplifier and then transmitted to the SAW sensor. When a reception signal is received from the SAW sensor, a delay time from when the transmission signal is transmitted to when the reception signal is received is analyzed. Thus, a physical quantity such as distortion or temperature is detected by a contactless method.

FIGS. 14 and 15 illustrate a detection principle of a conventional wireless remote sensing system 1. The wireless remote sensing system 1 includes a SAW sensor 2 and a sensing apparatus 3. The SAW sensor 2 includes a SAW reflector 7. The SAW reflector 7 has a piezoelectric substrate 4, a driving electrode 5 formed on the substrate 4, and a reflector electrode 6 formed on the substrate 4. The sensing apparatus 3 includes an oscillator 8, a first switch 9, a first amplifier 10, a second switch 11, a second amplifier 12, a mixer 13, and a low-pass filter 14.

As shown in FIG. 14, when the sensing apparatus 3 transmits a transmission signal to the SAW sensor 2, a movable contact 9a and a transmission contact 9b of the first switch 9 are connected so that the first switch 9 can go into a transmission state, and a movable contact 11a and an input contact 11b of the second switch 11 are connected so that the second switch 11 can go into an input state. At this time, a carrier wave, having a predetermined frequency, outputted from the oscillator 8 is pulse modulated by the first switch 9 so that a transmission signal can be generated. The transmission signal is amplified by the first amplifier 10 and transmitted through the second switch 11 to the SAW sensor 2. In the SAW sensor 2, the transmission signal is converted by the driving electrode 5 into a surface acoustic wave, and the surface acoustic wave propagates to the reflector electrode 6 by passing on the substrate 4. Then, the surface acoustic wave is reflected by the reflector electrode 6 and propagates to the driving electrode 5 by passing on the substrate 4. The surface acoustic wave is converted by the driving electrode 5 into a reception signal.

As shown in FIG. 15, when the sensing apparatus 3 receives the reception signal from the SAW sensor 2, the movable contact 9a and a reception contact 9c of the first switch 9 are connected so that the first switch 9 can go into a reception state, and the movable contact 11a and an output contact 11c of the second switch 11 are connected so that the second switch 11 can go into an output state. At this time, the reception signal transmitted from the SAW sensor 2 is amplified by the second amplifier 12 and inputted to the mixer 13 through the second switch 11. Further, the carrier wave outputted from the oscillator 8 is inputted as a local signal to the mixer 13. Thus, in the mixer 13, the reception signal and the local signal are mixed so that a synchronous detection signal can be generated. A high frequency component of the synchronous detection signal is removed by the low-pass filter 14 so that the synchronous detection signal can be outputted as a direct current (DC) signal from an output terminal 15 to external circuitry.

For example, the integration density of the sensing apparatus 3 can be increased by implementing the second switch 11 and the mixer 13 on a one chip of a silicon substrate 16, which is a semiconductor substrate. In this case, however, when the sensing apparatus 3 receives the reception signal from the SAW sensor 2, the carrier wave outputted from the oscillator 8 may pass on the silicon substrate 16 and be inputted as a leak signal to the second switch 11. If the leak signal is inputted to the second switch 11, it is difficult for the sensing apparatus 3 to accurately receive the reception signal from the SAW sensor 2. As a result, a sensing accuracy of the sensing apparatus 3 may be degraded.

SUMMARY

In view of the above, it is an object of the present disclosure to provide a wireless remote sensing system including a surface acoustic wave sensor and a high density integrated sensing apparatus for suitably receiving a reception signal transmitted from the surface acoustic wave sensor.

According to an aspect of the present disclosure, a wireless remote sensing system includes a carrier wave generator, a first switch, a surface acoustic wave (SAW) sensor, a second switch, a surface acoustic wave (SAW) delay element, and a mixer. The carrier wave generator generates a carrier wave of a predetermined frequency. The first switch switches between an ON state and an OFF state. In the ON state, the first switch generates a transmission signal of a predetermined frequency by pulse modulating the carrier wave. The SAW sensor has a predetermined delay time and receives the transmission signal. The SAW sensor outputs a reception signal of a predetermined frequency after the delay time has elapsed from receipt of the transmission signal. The second switch switches between an input state and an output state. In the input state, the second switch receives the transmission signal from the first switch in the ON state and transmits the transmission signal to the SAW sensor. In the output state, the second switch receives the reception signal from the SAW sensor and outputs the reception signal. The SAW delay element has the same delay time as the SAW sensor. The SAW delay element includes an input electrode for receiving the transmission signal from the first switch in the ON state and an output electrode for receiving a surface acoustic wave from the input electrode. The SAW delay element outputs a local signal of a predetermined frequency from the output electrode after the delay time has elapsed from receipt of the transmission signal by the input electrode. The mixer receives the reception signal from the second switch and the local signal from the SAW delay element. The mixer generates a synchronous detection signal by mixing the reception signal and the local signal. The second switch and the mixer are implemented on one chip of a semiconductor substrate. During a period of time when the second switch remains in the input state, the first switch switches from the OFF state to the ON state and then switches back to the OFF state. The second switch switches from the input state to the output state before the delay time has elapsed after the first switch switches back to the OFF state.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
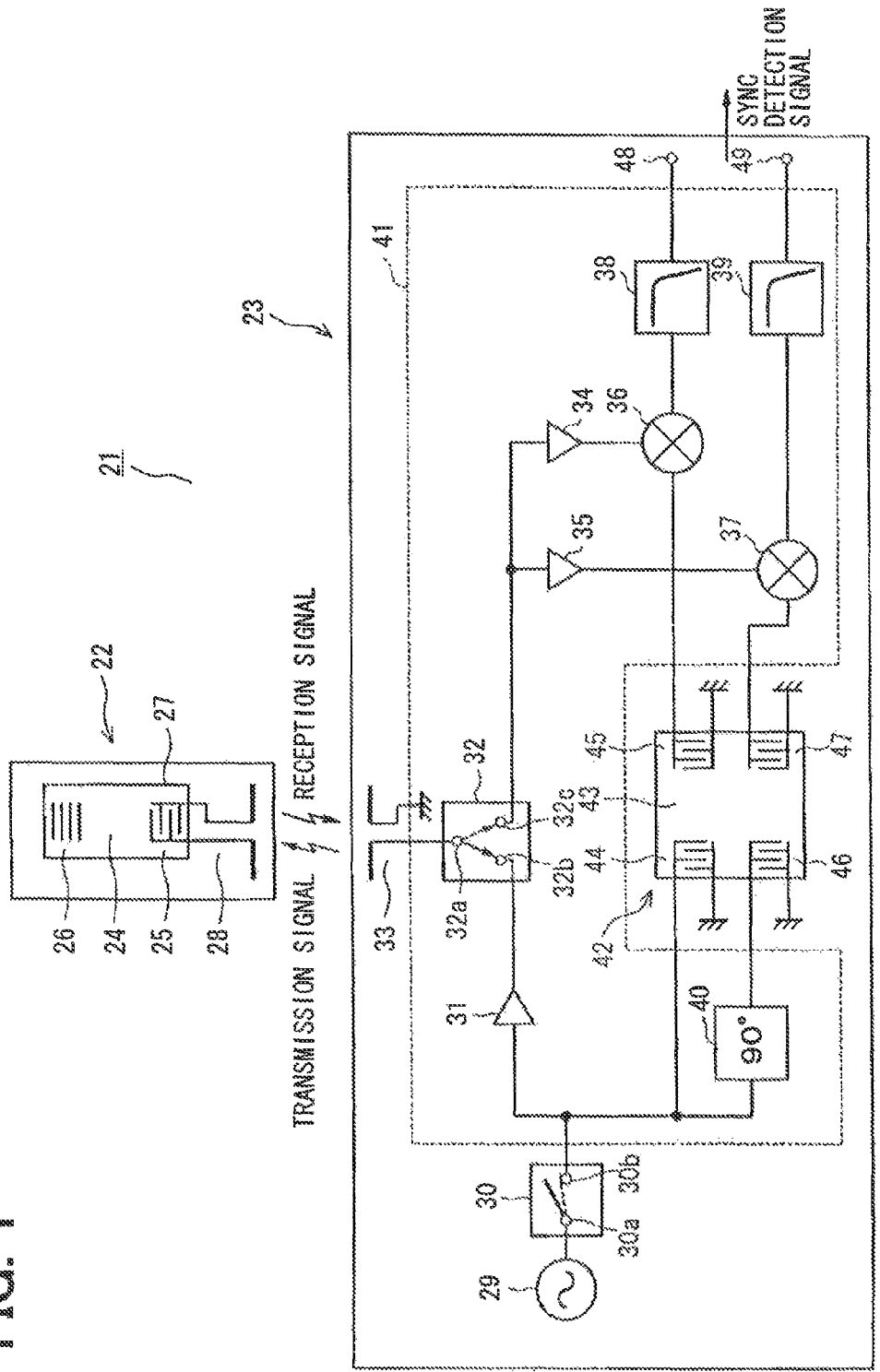
FIG. 1 is a functional block diagram of a wireless remote sensing system according a first embodiment of the present disclosure.

A wireless remote sensing system 21 according to first embodiment of a present disclosure is described below with reference to FIGS. 1, 2, and 3. The wireless remote sensing system 21 includes a surface acoustic wave (SAW) sensor 22 and a sensing apparatus 23.

The SAW sensor 22 includes a SAW reflector 27. The SAW reflector 27 has a piezoelectric substrate 24, a driving electrode 25 formed on the substrate 24, and a reflection electrode 26 formed on the piezoelectric substrate 24. An antenna 28 is connected to the driving electrode 25. Each of the driving electrode 25 and the reflection electrode 26 is a comb-shaped electrode in which conductive patterns having opposite polarities are alternatively arranged at a regular interval. The interval between the conductive patterns corresponds to a wavelength of a resonance frequency of the comb-shaped electrode. The product of the resonance frequency and the wavelength corresponds to a sound speed on the piezoelectric substrate 24 and has an intrinsic value determined by material and crystal orientation. Basic properties such as resonance frequency distribution and transmittance (attenuation) depend on the number and shape of electrode portions of the comb-shaped electrode. For example, according to the first embodiment, a reflection frequency fa of the SAW reflector 27 can be set to 200 [MHz]. The SAW reflector 27 is parasitic.

In the SAW sensor 22, when a transmission signal transmitted from the sensing apparatus 23 is received by the antenna 28 and inputted to the driving electrode 25, the transmission signal of high frequency is converted by piezoelectric phenomenon of the driving electrode 25 into a surface acoustic wave. The surface acoustic wave propagates from the driving electrode 25 to the reflection electrode 26 by passing on the piezoelectric substrate 24. Then, the surface acoustic wave is reflected by the reflection electrode 26 and propagates from the reflection electrode 26 to the driving electrode 25 by passing on the piezoelectric substrate 24. Then, the surface acoustic wave is converted by piezoelectric phenomenon of the driving electrode 25 into a reception signal of high frequency. The reception signal is transmitted from the antenna 28 to the sensing apparatus 23. The time elapsed from when the SAW sensor 22 receives the transmission signal from the sensing apparatus 23 to when the SAW sensor 22 transmits the reception signal to the sensing apparatus 23 is set as a delay time of the SAW reflector 27.

The sensing apparatus 23 includes an oscillator 29 (as a carrier wave generator), a first switch 30, a first amplifier 31, a second switch 32, an antenna 33, a second amplifier 34, a third amplifier 35, a first mixer 36, a second mixer 37, a first low-pass filter 38, a second low-pass filter 39, and a phase shifter 40. The first amplifier 31, the second switch 32, the antenna 33, the second amplifier 34, the third amplifier 35, the first mixer 36, the second mixer 37, the first low-pass filter 38, the second low-pass filter 39, and the phase shifter 40 are implemented on one chip of a silicon substrate 41 (as a semiconductor substrate). The sensing apparatus 23 further includes a SAW delay element 42 separate from the silicon substrate 41.

The oscillator 29 outputs a carrier wave to the first switch 30. The first switch 30 has a movable contact 30a and a fixed contact 30b. The first switch 30 can switch between an ON state and an OFF state. In the ON state, as indicated by a broken line in FIG. 1, the movable contact 30a and the fixed contact 30b are connected to each other. In the OFF state, as indicated by a solid line in FIG. 1, the movable contact 30a and the fixed contact 30b are disconnected from each other. When the carrier wave is inputted to the first switch 30 in the ON state, the carrier wave is pulse modulated to generate a pulse modulation signal. The pulse modulation signal is inputted as the transmission signal to the first amplifier 31. When receiving the transmission signal from the first switch 30, the first amplifier 31 amplifies the transmission signal and then outputs the transmission signal to the second switch 32.

The second switch 32 has a movable contact 32a, an input contact 32b, and an output contact 32c. The second switch 32 can switch between an input state and an output state. In the input state, as indicated by a solid arrow in FIG. 1, the movable contact 32a and the input contact 32b are connected to each other. In the output state, as indicated by a broken arrow in FIG. 1, the movable contact 32a and the output contact 32c are connected to each other. When the transmission signal is inputted from the first amplifier 31 to the second switch 32 in the input state, the transmission signal is transmitted from the antenna 33 to the SAW sensor 22.

In contrast, when the reception signal is inputted to the second switch 32 in the output state from the SAW sensor 22 through the antenna 33, the reception signal is outputted to the second amplifier 34 and the third amplifier 35. When receiving the reception signal from the second switch 32, the second amplifier 34 amplifies the reception signal and then outputs the reception signal to the first mixer 36. When receiving the reception signal from the second switch 32, the third amplifier 35 amplifies the reception signal and then outputs the reception signal to the second mixer 37.

When receiving not only the reception signal from the second amplifier 34 but only a local signal from the SAW delay element 42, the first mixer 36 mixes the reception signal and the local signal. When receiving not only the reception signal from the third amplifier 35 but only the local signal from the SAW delay element 42, the second mixer 37 mixes the reception signal and the local signal.

The SAW delay element 42 includes a piezoelectric substrate 43, a first input electrode 44, a first output electrode 45, a second input electrode 46, and a second output electrode 47. The first input electrode 44, the first output electrode 45, the second input electrode 46, and the second output electrode 47 are formed on the piezoelectric substrate 43. Like the driving electrode 25 and the reflection electrode 26, each of the first input electrode 44, the first output electrode 45, the second input electrode 46, and the second output electrode 47 is a comb-shaped electrode in which conductive patterns having opposite polarities are alternatively arranged at a regular interval. The interval between the conductive patterns corresponds to a wavelength of a resonance frequency of the comb-shaped electrode.

The SAW delay element 42 is designed so that the surface acoustic wave having the same frequency as the reflection frequency fa of the SAW reflector 27 can pass through the SAW delay element 42. The time elapsed from when the SAW delay element 42 receives the transmission signal from the first switch 30 to when the SAW delay element 42 outputs the local signal to the first mixer 36 and the second mixer 37 is set as a delay time of the SAW delay element 42. The delay time of the SAW delay element 42 is set equal to the delay time of the SAW reflector 27.

In the SAW delay element 42, when the transmission signal outputted from the first switch 30 in the ON state is inputted to the first input electrode 44, the transmission signal of high frequency is converted by piezoelectric phenomenon of the first input electrode 44 into a surface acoustic wave. Then, the surface acoustic wave propagates from the first input electrode 44 to the first output electrode 45 by passing on the piezoelectric substrate 43. Then, the surface acoustic wave is converted by piezoelectric phenomenon of the first output electrode 45 into the local signal of high frequency. Then, the local signal is outputted to the first mixer 36.

Further, in the SAW delay element 42, when the transmission signal outputted from the first switch 30 in the ON state is inputted to the second input electrode 46 after being phase-shifted by 90 degrees by the phase shifter 40, the transmission signal of high frequency is converted by piezoelectric phenomenon of the second input electrode 46 into a surface acoustic wave. Then, the surface acoustic wave propagates from the second input electrode 46 to the second output electrode 47 by passing on the piezoelectric substrate 43. Then, the surface acoustic wave is converted by piezoelectric phenomenon of the second output electrode 47 into the local signal of high frequency. Then, the local signal is outputted to the second mixer 37.

Figure 2:
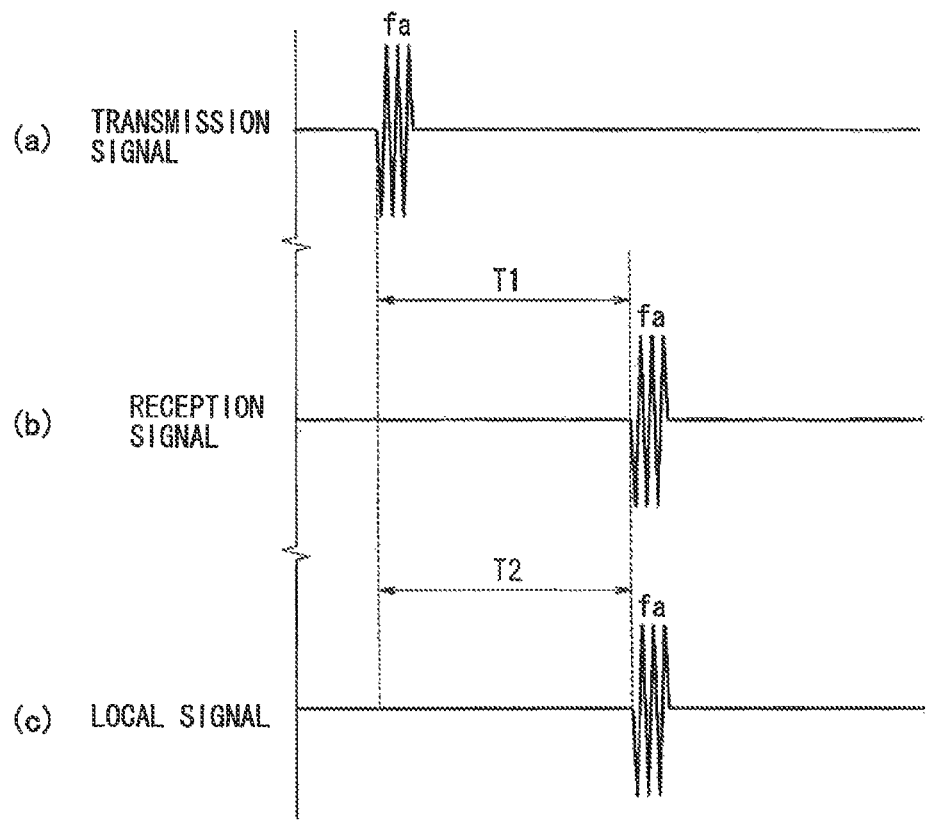
FIG. 2 is a diagram illustrating waveforms of a transmission signal, a reception signal, and a local signal observed in the wireless remote sensing system of FIG. 1.

In such a configuration, as shown in FIG. 2, a time delay T1 from when the first switch 30 transmits the transmission signal to when the second amplifier 34 and the third amplifier 35 output the reception signal (i.e., to when the reception signal is inputted to the first mixer 36 and the second mixer 37) becomes equal to a time delay T2 from when the first switch 30 transmits the transmission signal to when the SAW delay element 42 outputs the local signal (i.e., to when the local signal is inputted to the first mixer 36 and the second mixer 37). Thus, the reception signal and the local signal are inputted to the first mixer 36 and the second mixer 37 at the same time.

As a result, in each of the first mixer 36 and the second mixer 37, the reception signal and the local signal are mixed into a synchronous detection signal. The synchronous detection signal outputted from the first mixer 36 is filtered by the first low-pass filter 38 to remove a high frequency component of the synchronous detection signal and then outputted as a direct-current (DC) signal to external circuitry from a first output terminal 48 of the sensing apparatus 23. The synchronous detection signal outputted from the second mixer 37 is filtered by the second low-pass filter 39 to remove a high frequency component of the synchronous detection signal and then outputted as a DC signal to external circuitry from a second output terminal 49 of the sensing apparatus 23. In an example shown in FIG. 1, the phase shifter 40 is located in a preceding stage (i.e., input stage) of the SAW delay element 42 so that the transmission signal can be phase-shifted by 90 degrees. Alternatively, the phase shifter 40 can be located in a subsequent stage (i.e., output stage) of the SAW delay element 42 so that the local signal can be phase-shifted by 90 degrees.

Figure 3:
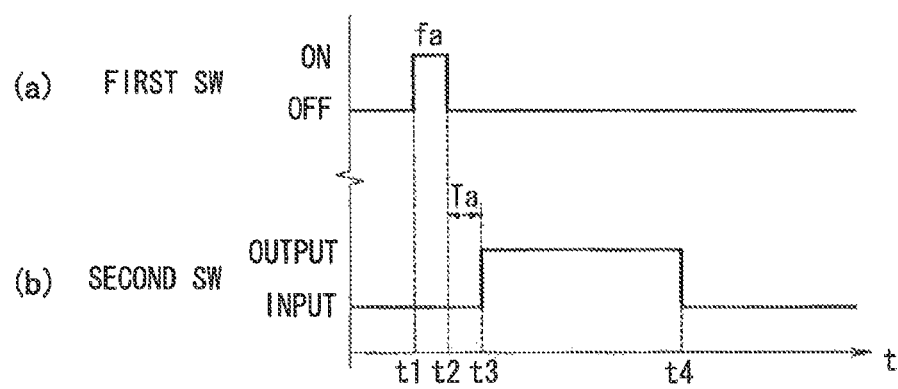
FIG. 3 is a timing diagram of a first switch and a second switch of the wireless remote sensing system of FIG. 1.

According to the first embodiment, the first switch 30 (denoted as the "first SW" in FIG. 3) and the second switch 32 (denoted as the "second SW" in FIG. 3) are controlled as shown in FIG. 3. Specifically, when the transmission signal having the same frequency (i.e., a predetermined frequency) as the reflection frequency fa of the SAW reflector 27 is transmitted, the first switch 30 and the second switch 32 are controlled as follows. Firstly, the first switch 30 is caused to switch from the OFF state to the ON state at a time t1 under a condition where the second switch 32 is in the input state. Then, the first switch 30 is caused to switch from the ON state to the OFF state at a time t2 after the time t1 under a condition where the second switch 32 remains in the input state. Then, the second switch 32 is caused to switch from the input state to the output state at a time t3 after the time t2 under a condition where the first switch 30 remains in the OFF state. It is noted that a time difference Ta from when the first switch 30 is caused to switch from the ON state to the OFF state to when the second switch 32 is caused to switch from the input state to the output state is smaller than each of the delay time of the SAW sensor 22 and the delay time of the SAW delay element 42.

By controlling the first switch 30 and the second switch 32 as described above, a passage for allowing the carrier wave outputted from the oscillator 29 to propagate to the silicon substrate 41 is blocked during a period of time when the reception signal transmitted from the SAW sensor 22 is received. Thus, propagation of the carrier wave on the silicon substrate 41 is prevented so that an input of the carrier wave as a leak current to the second switch 32 can be prevented.

As described above, according to the first embodiment, in the sensing apparatus 23, the second switch 32, the first mixer 36, and the second mixer 37 are implemented on one chip of the silicon substrate 41. In such an approach, integration density of the sensing apparatus 23 can be increased. Further, the sensing apparatus 23 includes the SAW delay element 42. The delay time of the SAW delay element 42 is equal to the delay time of the SAW sensor 22. Under the condition where the second switch 32 remains in the input state, the first switch 30 switches from the OFF state to the ON state and then switches from the ON state to the OFF state. Then, the second switch 32 switches from the input state to the output state before the delay time has elapsed after the first switch 30 switches from the ON state to the OFF state. In such an approach, despite the high degree integration of the sensing apparatus 23, it is possible to prevent the carrier wave outputted from the oscillator 29 from being inputted as a leak current to the second switch 32 during a period of time when the reception signal transmitted from the SAW sensor 22 is received. Thus, the reception signal transmitted from the SAW sensor 22 is accurately received so that sensing accuracy can be improved.

Second Embodiment

Figure 4:
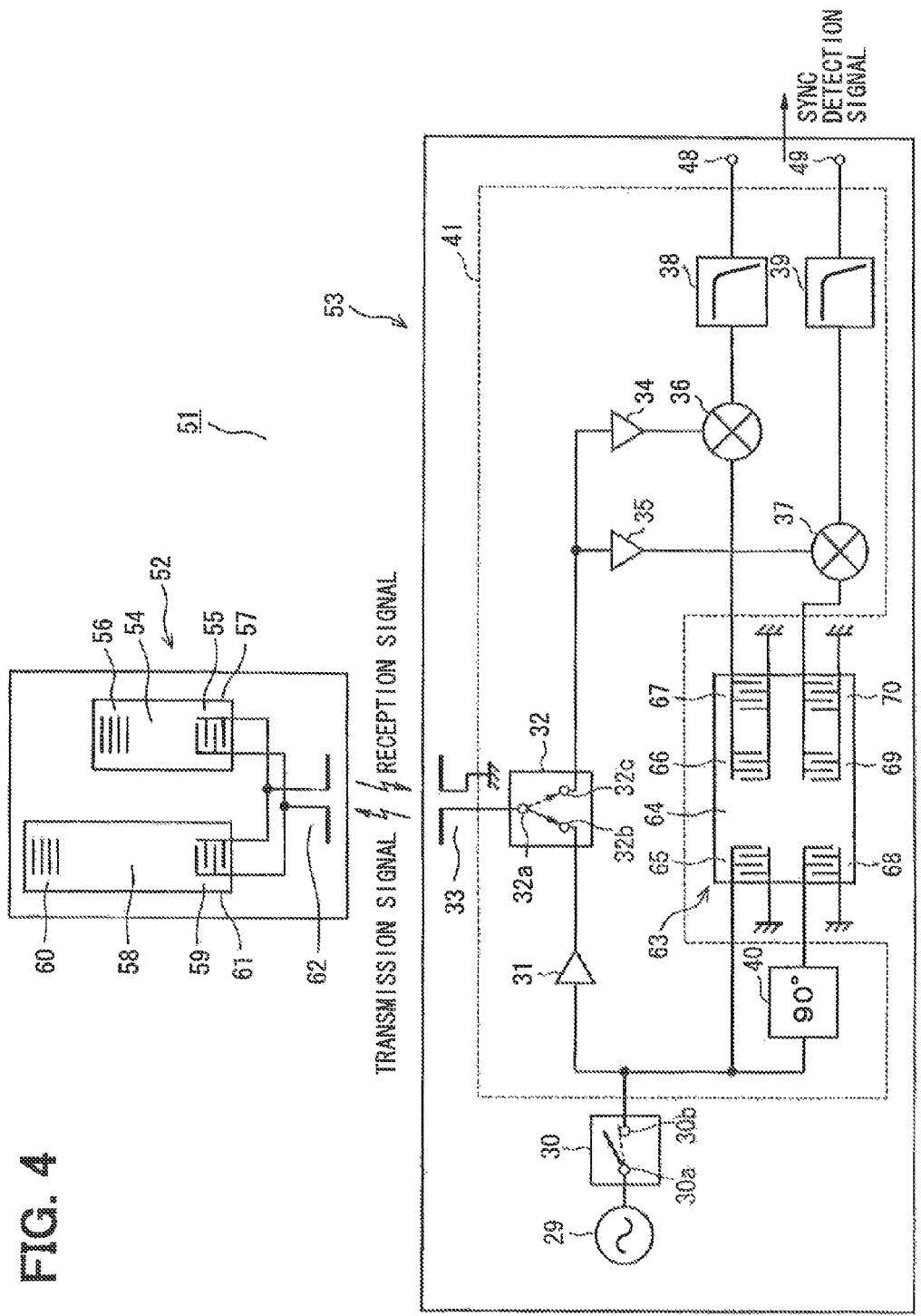
FIG. 4 is a functional block diagram of a wireless remote sensing system according a second embodiment of the present disclosure.

A wireless remote sensing system 51 according to a second embodiment of the present disclosure is described below with reference to FIGS. 4 and 5. A difference between the first embodiment and the second embodiment is as follows.

The wireless remote sensing system 51 includes a SAW sensor 52 and a sensing apparatus 53. The SAW sensor 52 differs in property from the SAW sensor 22 of the first embodiment. The SAW sensor 52 includes a first SAW reflector 57 and a second SAW reflector 61. The first SAW reflector 57 includes a first piezoelectric substrate 54, a first driving electrode 55 formed on the first piezoelectric substrate 54, and a first reflection electrode 56 formed on the first piezoelectric substrate 54. The second SAW reflector 61 includes a second piezoelectric substrate 58, a second driving electrode 59 formed on the second piezoelectric substrate 58, and a second reflection electrode 60 formed on the second piezoelectric substrate 58. The first driving electrode 55 and the second driving electrode 59 are connected to an antenna 62.

In the SAW sensor 52, a reflection frequency of the first SAW reflector 57 is set equal to a reflection frequency of the second SAW reflector 61. For example, each of the reflection frequencies of the first SAW reflector 57 and the second SAW reflector 51 can be set to 200 [MHz]. A distance between the first driving electrode 55 and the first reflection electrode 56 is different from a distance between the second driving electrode 59 and the second reflection electrode 60 so that a delay time of the first SAW reflector 57 can be different from a delay time of the second SAW reflector 61. That is, the first SAW reflector 57 has a first delay time, and the second SAW reflector 61 has a second delay time different from the first delay time.

The sensing apparatus 53 includes the oscillator 29, the first switch 30, the first amplifier 31, the second switch 32, the antenna 33, the second amplifier 34, the third amplifier 35, the first mixer 36, the second mixer 37, the first low-pass filter 38, the second low-pass filter 39, and the phase shifter 40. Further, the sensing apparatus 53 includes a SAW delay element 63. The SAW delay element 63 differs in property from the SAW delay element 42 of the first embodiment. The SAW delay element 63 includes a piezoelectric substrate 64, a first input electrode 65, a first front output electrode 66, a first rear output electrode 67, a second input electrode 68, a second front output electrode 69, and a second rear output electrode 70.

The SAW delay element 63 is designed so that a surface acoustic wave having the same frequency as the reflection frequency of each of the first SAW reflector 57 and the second SAW reflector 61 can pass through the SAW delay element 63. The time elapsed from when the SAW delay element 63 receives the transmission signal from the first switch 30 to when the SAW delay element 63 outputs the local signal to the first mixer 36 and the second mixer 37 is set as a delay time of the SAW delay element 63. Since the output electrode has both a front electrode and a rear electrode, the delay time of the SAW delay element 63 can be set equal to the delay time of each of the first SAW reflector 57 and the second SAW reflector 61.

In the first SAW delay element 63, when the transmission signal outputted from the first switch 30 in the ON state is inputted to the first input electrode 65, the transmission signal of high frequency is converted by piezoelectric phenomenon of the first input electrode 65 into a surface acoustic wave. Then, the surface acoustic wave propagates from the first input electrode 65 to the first front output electrode 66 and the first rear output electrode 67 by passing on the piezoelectric substrate 64. Then, the surface acoustic wave is converted by piezoelectric phenomenon of the first front output electrode 66 and the first rear output electrode 67 into a local signal of high frequency. Then, the local signal is outputted to the first mixer 36.

Further, in the SAW delay element 63, when the transmission signal outputted from the first switch 30 in the ON state is inputted to the second input electrode 68 after being phase-shifted by 90 degrees by the phase shifter 40, the transmission signal of high frequency is converted by piezoelectric phenomenon of the second input electrode 68 into a surface acoustic wave. Then, the surface acoustic wave propagates from the second input electrode 68 to the second front output electrode 69 and the second rear output electrode 70 by passing on the piezoelectric substrate 64. Then, the surface acoustic wave is converted by piezoelectric phenomenon of the second front output electrode 69 and the second rear output electrode 70 into the local signal of high frequency. Then, the local signal is outputted to the second mixer 37.

Figure 5:
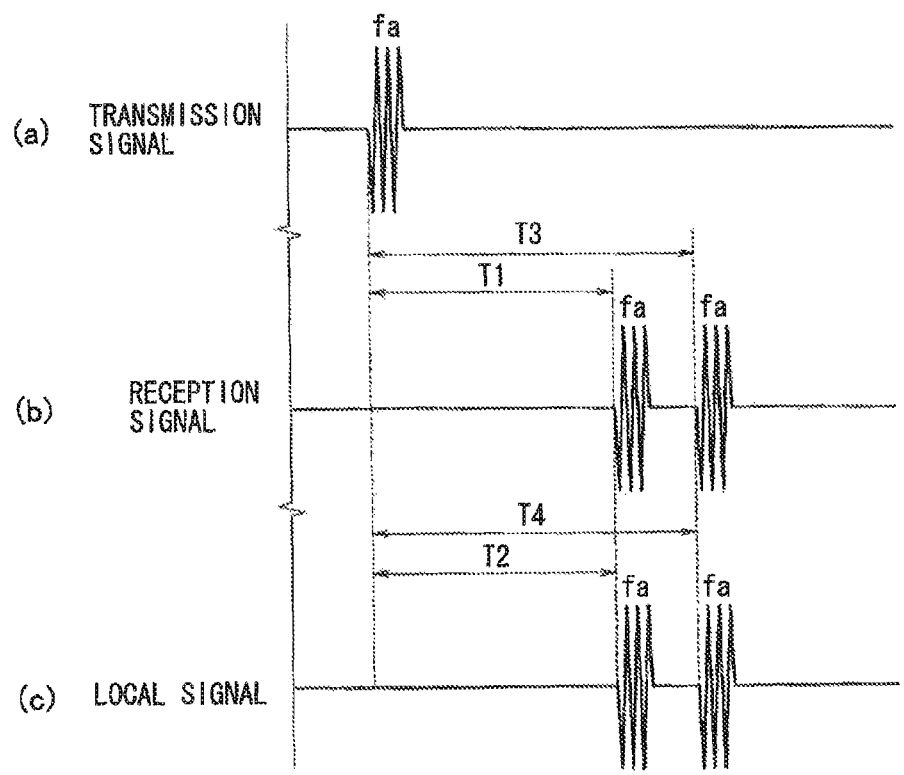
FIG. 5 is a diagram illustrating waveforms of a transmission signal, a reception signal, and a local signal observed in the wireless remote sensing system of FIG. 4.

In such a configuration, as shown in FIG. 5, a time delay T1 from when the first switch 30 transmits the transmission signal to when the second amplifier 34 and the third amplifier 35 output a first reception signal (i.e., to when the first reception signal is inputted to the first mixer 36 and the second mixer 37) becomes equal to a time delay T2 from when the first switch 30 transmits the transmission signal to when the SAW delay element 42 outputs a first local signal (i.e., to when the first local signal is inputted to the first mixer 36 and the second mixer 37). Likewise, a time delay T3 from when the first switch 30 transmits the transmission signal to when the second amplifier 34 and the third amplifier 35 output a second reception signal (i.e., to when the second reception signal is inputted to the first mixer 36 and the second mixer 37) becomes equal to a time delay T4 from when the first switch 30 transmits the transmission signal to when the SAW delay element 42 outputs a second local signal (i.e., to when the second local signal is inputted to the first mixer 36 and the second mixer 37). Thus, the reception signal and the local signal are inputted to the first mixer 36 and the second mixer 37 at the same time. It is noted that the first switch 30 and the second switch 32 are controlled as described in the first embodiment.

As described above, according to the second embodiment, multiple reception signals having different delay times are transmitted from the SAW sensor 52, and multiple local signals having different delay times are outputted from the SAW delay element 63. The reception signals are mixed with the local signals so that multiple synchronous detection signals can be outputted. In such an approach, a change in delay time of the SAW sensor 52 due to a change in temperature can be corrected so that a reduction in sensing accuracy can be prevented.

Third Embodiment

Figure 6:
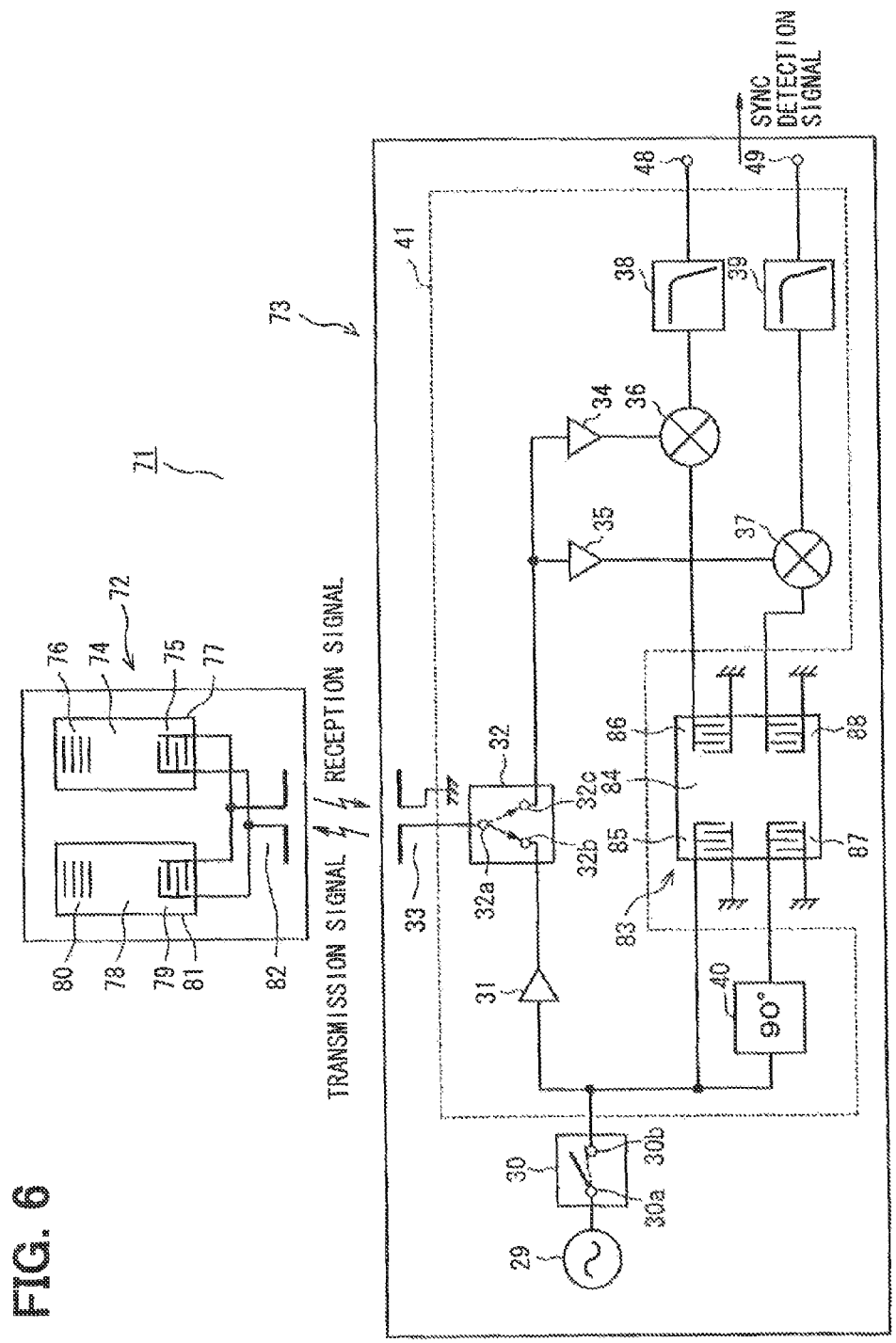
FIG. 6 is a functional block diagram of a wireless remote sensing system according a third embodiment of the present disclosure.

A wireless remote sensing system 71 according to a third embodiment of the present disclosure is described below with reference to FIGS. 6, 7, and 8. A difference between the first embodiment and the third embodiment is as follows.

The wireless remote sensing system 71 includes a SAW sensor 72 and a sensing apparatus 73. The SAW sensor 72 differs in property from the SAW sensor 22 of the first embodiment. The SAW sensor 72 includes a first SAW reflector 77 and a second SAW reflector 81. The first SAW reflector 77 includes a first piezoelectric substrate 74, a first driving electrode 75 formed on the first piezoelectric substrate 74, and a first reflection electrode 76 formed on the first piezoelectric substrate 74. The second SAW reflector 81 includes a second piezoelectric substrate 78, a second driving electrode 79 formed on the second piezoelectric substrate 78, and a second reflection electrode 80 formed on the second piezoelectric substrate 78. The first driving electrode 75 and the second driving electrode 79 are connected to an antenna 82.

In the SAW sensor 72, a reflection frequency fa of the first SAW reflector 77 is set different from a reflection frequency fb of the second SAW reflector 81. For example, according to the third embodiment, the reflection frequency fa of the first SAW reflector 77 can be set to 200 [MHz], and the reflection frequency fb of the second SAW reflector 81 can be set to 210 [MHz].

The sensing apparatus 73 includes the oscillator 29, the first switch 30, the first amplifier 31, the second switch 32, the antenna 33, the second amplifier 34, the third amplifier 35, the first mixer 36, the second mixer 37, the first low-pass filter 38, the second low-pass filter 39, and the phase shifter 40. Further, the sensing apparatus 73 includes a SAW delay element 83. The SAW delay element 83 differs in property from the SAW delay element 42 of the first embodiment. The SAW delay element 83 includes a piezoelectric substrate 84, a first input electrode 85, a first output electrode 86, a second input electrode 87, and a second output electrode 88.

The SAW delay element 83 is designed so that each of a surface acoustic wave having the same frequency as the reflection frequency fa of the first SAW reflector 77 and a surface acoustic wave having the same frequency as the reflection frequency fb of the second SAW reflector 81 can pass through the SAW delay element 83. A delay time of the SAW delay element 83 is set equal to a delay time of each of the first SAW reflector 77 and the second SAW reflector 81.

Figure 7:
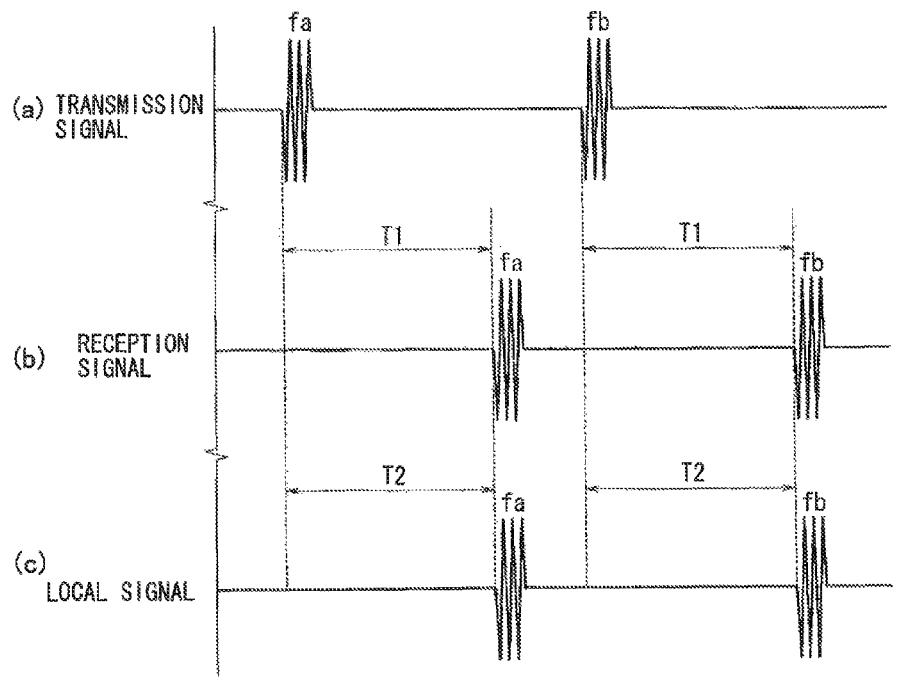
FIG. 7 is a diagram illustrating waveforms of a transmission signal, a reception signal, and a local signal observed in the wireless remote sensing system of FIG. 6.

In such a configuration, as shown in FIG. 7, a time delay T1 from when the first switch 30 transmits a first transmission signal of a first frequency to when the second amplifier 34 and the third amplifier 35 output a first reception signal of a first frequency (i.e., to when the first reception signal is inputted to the first mixer 36 and the second mixer 37) becomes equal to a time delay T2 from when the first switch 30 transmits the first transmission signal to when the SAW delay element 42 outputs a first local signal of a first frequency (i.e., to when the first local signal is inputted to the first mixer 36 and the second mixer 37). Likewise, the time delay T1 from when the first switch 30 transmits a second transmission signal of a second frequency to when the second amplifier 34 and the third amplifier 35 output a second reception signal of a second frequency (i.e., to when the second reception signal is inputted to the first mixer 36 and the second mixer 37) becomes equal to the time delay T2 from when the first switch 30 transmits the second transmission signal to when the SAW delay element 42 outputs a second local signal of a second frequency (i.e., to when the second local signal is inputted to the first mixer 36 and the second mixer 37). Thus, the reception signal and the local signal are inputted to the first mixer 36 and the second mixer 37 at the same time.

Figure 8:
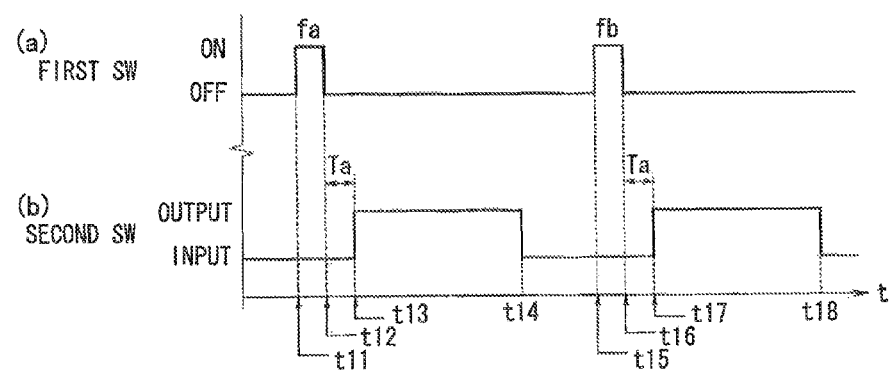
FIG. 8 is a timing diagram of a first switch and a second switch of the wireless remote sensing system of FIG. 6.

According to the third embodiment, the first switch 30 (denoted as the "first SW" in FIG. 3) and the second switch 32 (denoted as the "second SW" in FIG. 3) are controlled as shown in FIG. 8. Specifically, when the transmission signal having the same frequency as the reflection frequency fa of the first SAW reflector 77 is transmitted, the first switch 30 and the second switch 32 are controlled as follows. Firstly, the first switch 30 is caused to switch from the OFF state to the ON state at a time t11 under a condition where the second switch 32 is in the input state. Then, the first switch 30 is caused to switch from the ON state to the OFF state at a time t12 after the time t11 under a condition where the second switch 32 remains in the input state. Then, the second switch 32 is caused to switch from the input state to the output state at a time t13 after the time t12 under a condition where the first switch 30 remains in the OFF state.

Then, when the transmission signal having the same frequency as the reflection frequency fb of the second SAW reflector 81 is transmitted, the first switch 30 and the second switch 32 are controlled as follows. Firstly, the first switch 30 is caused to switch from the OFF state to the ON state at a time t15 under a condition where the second switch 32 is in the input state. Then, the first switch 30 is caused to switch from the ON state to the OFF state at a time t16 after the time t15 under a condition where the second switch 32 remains in the input state. Then, the second switch 32 is caused to switch from the input state to the output state at a time t17 after the time t16 under a condition where the first switch 30 remains in the OFF state. It is noted that a time difference Ta from when the first switch 30 is caused to switch from the ON state to the OFF state to when the second switch 32 is caused to switch from the input state to the output state is smaller than each of the delay time of the first SAW reflector 77 and the delay time of the second SAW reflector 81.

As described above, according to the third embodiment, multiple reception signals having different frequencies are transmitted from the SAW sensor 72, and multiple local signals having different frequencies are outputted from the SAW delay element 83. The reception signals are mixed with the local signals so that multiple synchronous detection signals can be outputted. In such an approach, a change in delay time of the SAW sensor 72 due to a change in temperature can be corrected so that a reduction in sensing accuracy can be prevented.

Fourth Embodiment

Figure 9:
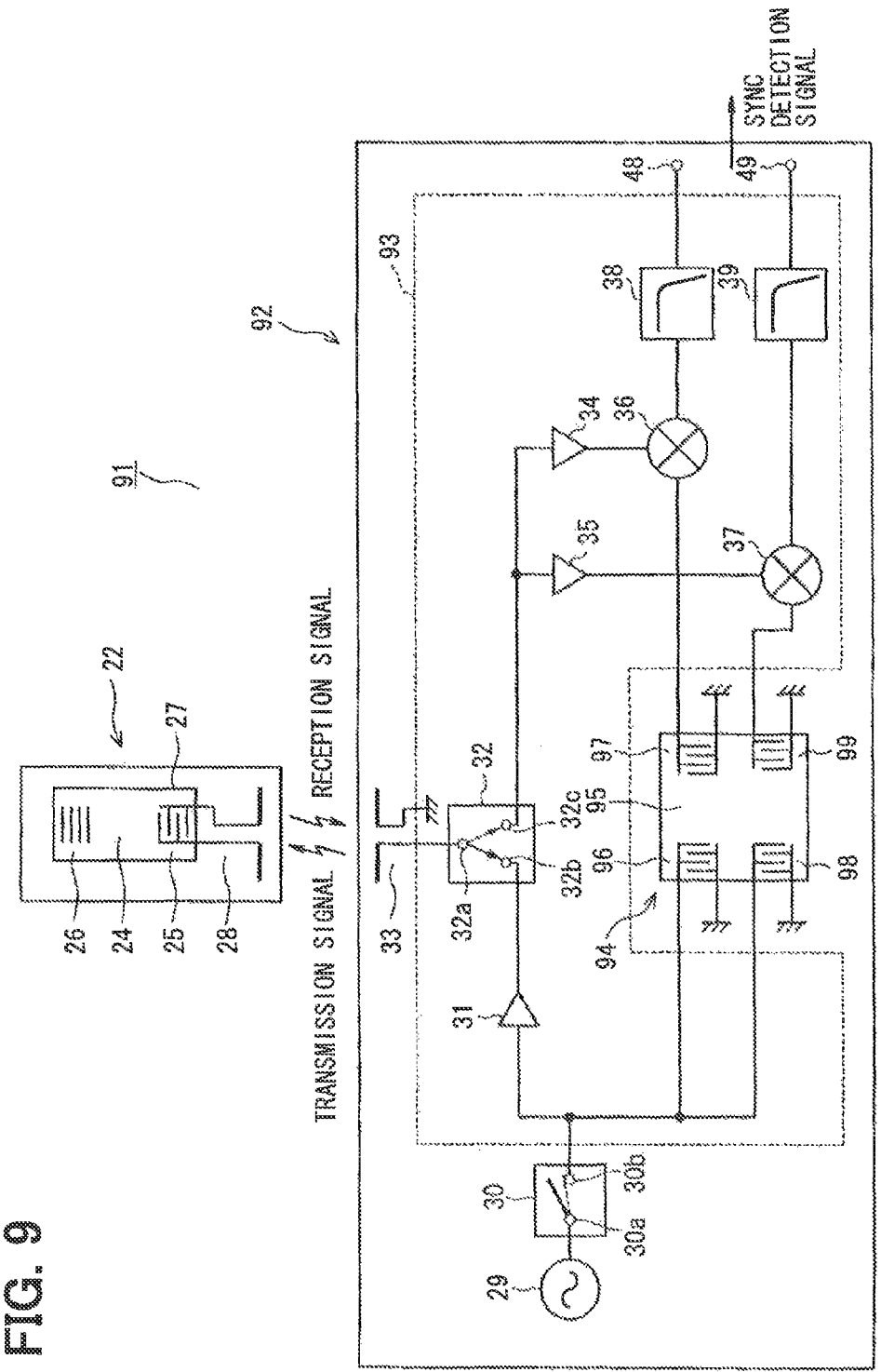
FIG. 9 is a functional block diagram of a wireless remote sensing system according a fourth embodiment of the present disclosure.
Figure 10:
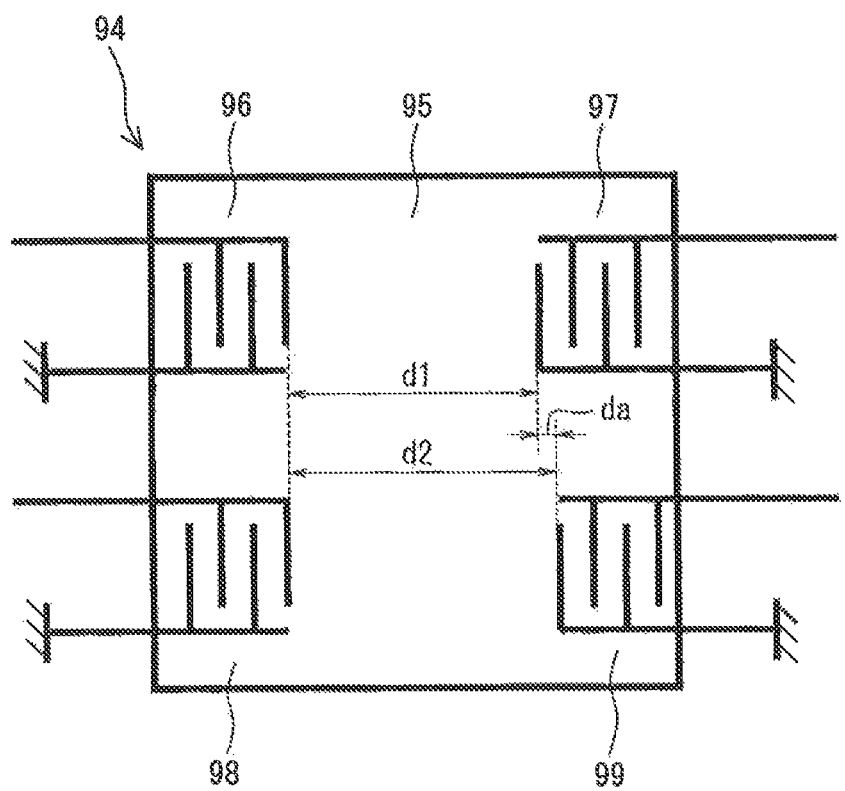
FIG. 10 is a diagram illustrating an enlarged view of a SAW delay element of the wireless remote sensing system of FIG. 9.

A wireless remote sensing system 91 according to a fourth embodiment of the present disclosure is described below with reference to FIGS. 9 and 10. A difference between the first embodiment and the fourth embodiment is as follows.

The wireless remote sensing system 91 includes the SAW sensor 22 of the first embodiment and a sensing apparatus 92. A difference between the sensing apparatus 92 and the sensing apparatus 23 of the first embodiment is that the sensing apparatus 92 does not have the phase shifter 40. In the sensing apparatus 92, the other elements except the phase shifter 40 are implemented on one chip of a silicon substrate 93.

The sensing apparatus 92 includes a SAW delay element 94 instead of the SAW delay element 42. The SAW delay element 94 includes a piezoelectric substrate 95, a first input electrode 96, a first output electrode 97, a second input electrode 98, and a second output electrode 99. The first input electrode 96, the first output electrode 97, the second input electrode 98, and the second output electrode 99 are formed on the piezoelectric substrate 95. As shown in FIG. 10, the first output electrode 97 and the second output electrode 99 are misaligned (i.e., input side ends (right side in FIG. 10) for receiving the surface acoustic wave are misaligned) so that a difference da between a distance d1 from the first input electrode 96 to the first output electrode 97 and a distance d2 from the second input electrode 98 to the second output electrode 99 can correspond to a phase delay of 90 degrees of the transmission signal. In such an approach, the local signal outputted from the first output electrode 97 is phase shifted by 90 degrees relative to the local signal outputted from the second output electrode 99.

As described above, according to the fourth embodiment, the difference da between the distance d1 from the first input electrode 96 to the first output electrode 97 and the distance d2 from the second input electrode 98 to the second output electrode 99 corresponds to the phase delay of 90 degrees of the transmission signal. Thus, in a quadrature detection, the phase shift of the surface acoustic wave can be performed in the SAW delay element 94 without using the phase shifter 40 for performing the phase shift of the transmission signal inputted to the SAW delay element 94. Thus, the phase shifter 40 can be removed so that circuit size can be reduced. Further, the phase delay amount can be accurately controlled.

Fifth Embodiment

Figure 11:
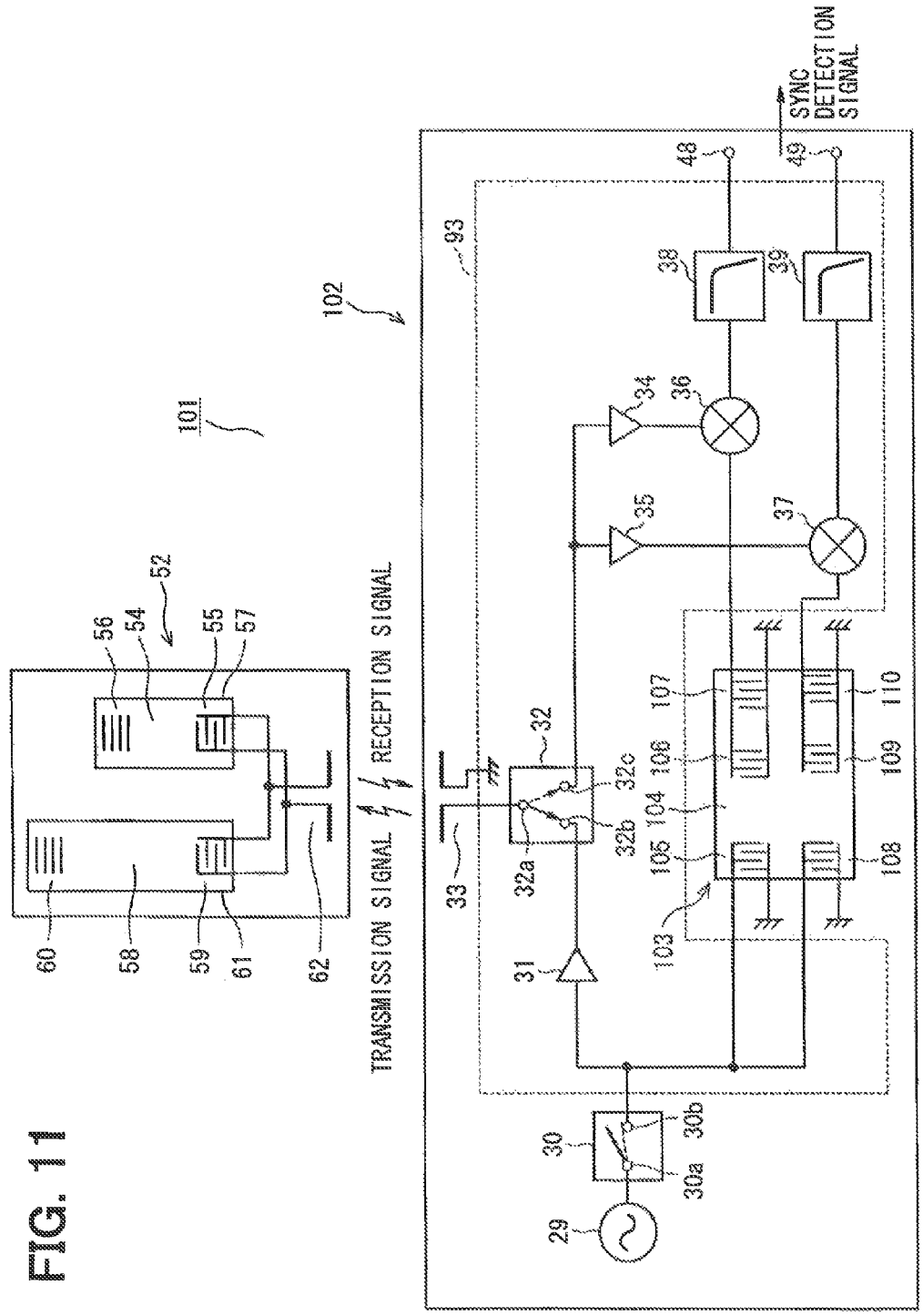
FIG. 11 is a functional block diagram of a wireless remote sensing system according a fifth embodiment of the present disclosure.
Figure 12:
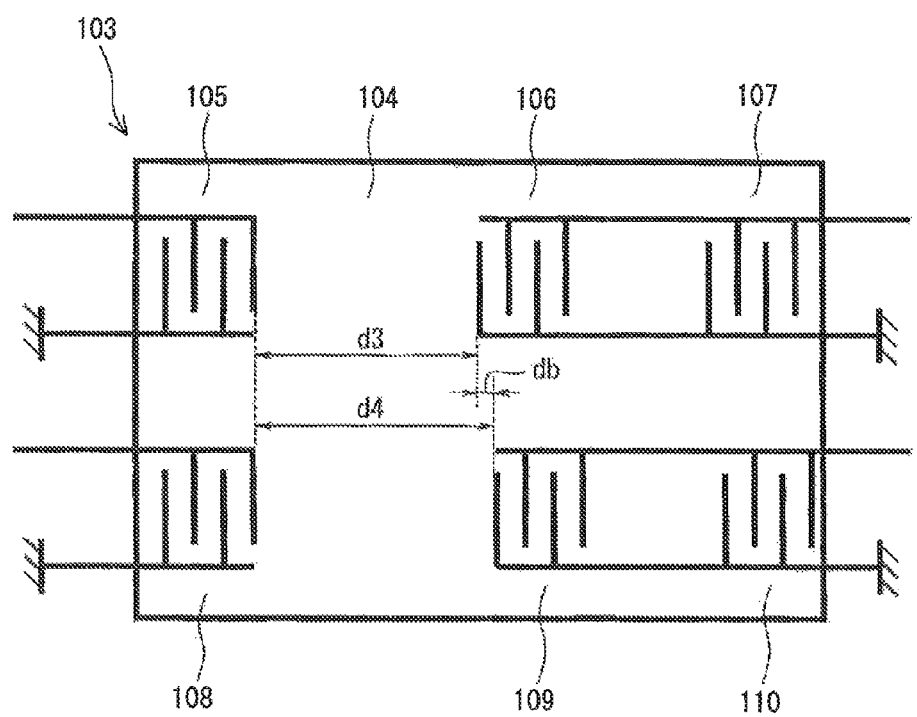
FIG. 12 is a diagram illustrating an enlarged view of a SAW delay element of the wireless remote sensing system of FIG. 11.

A wireless remote sensing system 101 according to a fifth embodiment of the present disclosure is described below with reference to FIGS. 11 and 12. A difference between the second embodiment and the Fifth embodiment is as follows.

The difference between the second embodiment and the fifth embodiment is similar to the difference between the first embodiment and the fourth embodiment. Specifically, the wireless remote sensing system 101 includes the SAW sensor 52 of the second embodiment and a sensing apparatus 102. A difference between the sensing apparatus 102 and the sensing apparatus 53 of the second embodiment is that the sensing apparatus 102 does not have the phase shifter 40. In the sensing apparatus 102, the other elements except the phase shifter 40 are implemented on one chip of a silicon substrate 93.

The sensing apparatus 102 includes a SAW delay element 103 instead of the SAW delay element 63. The SAW delay element 103 includes a piezoelectric substrate 104, a first input electrode 105, a first front output electrode 106, a first rear output electrode 107, a second input electrode 108, a second front output electrode 109, and a second rear output electrode 110. The first input electrode 105, the first front output electrode 106, the first rear output electrode 107, the second input electrode 108, the second front output electrode 109, and the second rear output electrode 110 are formed on the piezoelectric substrate 104. As shown in FIG. 12, a difference db between a distance d3 from the first input electrode 105 to the first front output electrode 106 (and the first rear output electrode 107) and a distance d4 from the second input electrode 108 to the second front output electrode 109 (and the second rear output electrode 110) corresponds to a phase delay of 90 degrees of the transmission signal. In such an approach, the local signal outputted from the first front output electrode 106 is phase shifted by 90 degrees relative to the local signal outputted from the second front output electrode 109, and the local signal outputted from the first rear output electrode 107 is phase shifted by 90 degrees relative to the local signal outputted from the second rear output electrode 110.

As described above, according to the fifth embodiment, the difference db between the distance d3 from the first input electrode 105 to the first front output electrode 106 (and the first rear output electrode 107) and the distance d4 from the second input electrode 108 to the second front output electrode 109 (and the second rear output electrode 110) corresponds to the phase delay of 90 degrees of the transmission signal. Thus, in quadrature detection, the phase shift of the surface acoustic wave can be performed in the SAW delay element 103 without using the phase shifter 40 for performing the phase shift of the transmission signal inputted to the SAW delay element 103. Thus, the phase shifter 40 can be removed so that circuit size can be reduced. Further, the phase delay amount can be accurately controlled.

Sixth Embodiment

Figure 13:
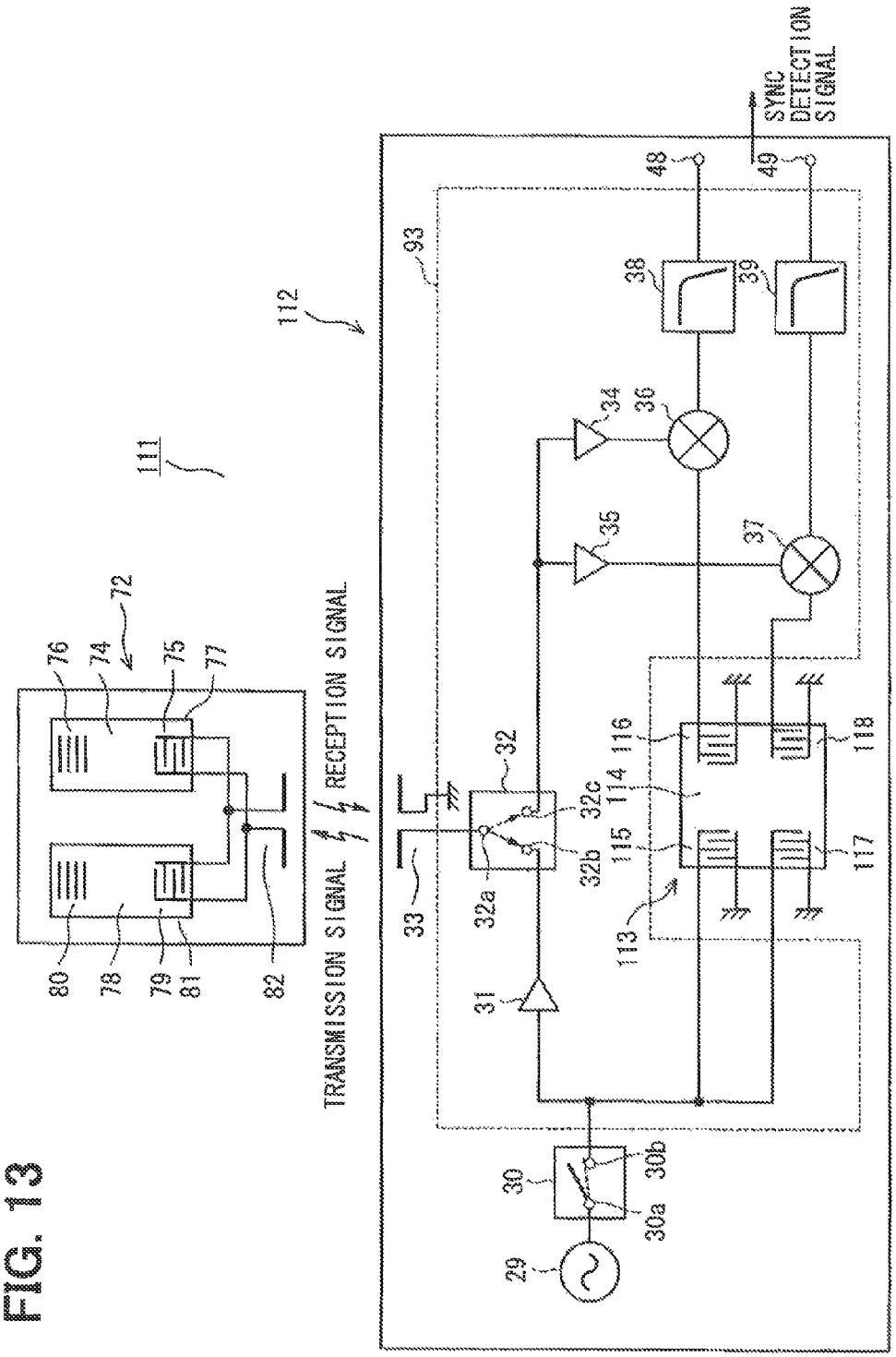
FIG. 13 is a functional block diagram of a wireless remote sensing system according a sixth embodiment of the present disclosure.
Figure 14:
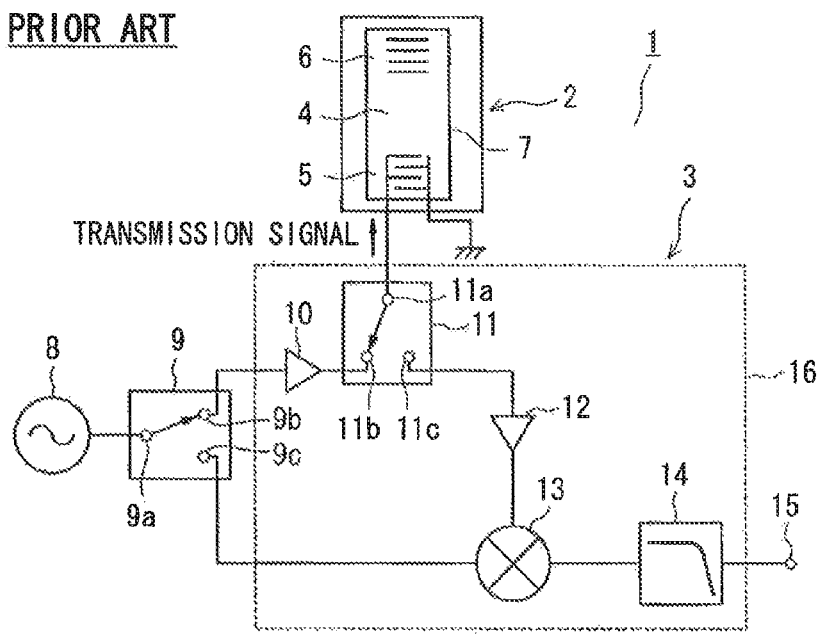
FIG. 14 is a functional block diagram of a conventional wireless remote sensing system observed when a transmission signal is transmitted.
Figure 15:
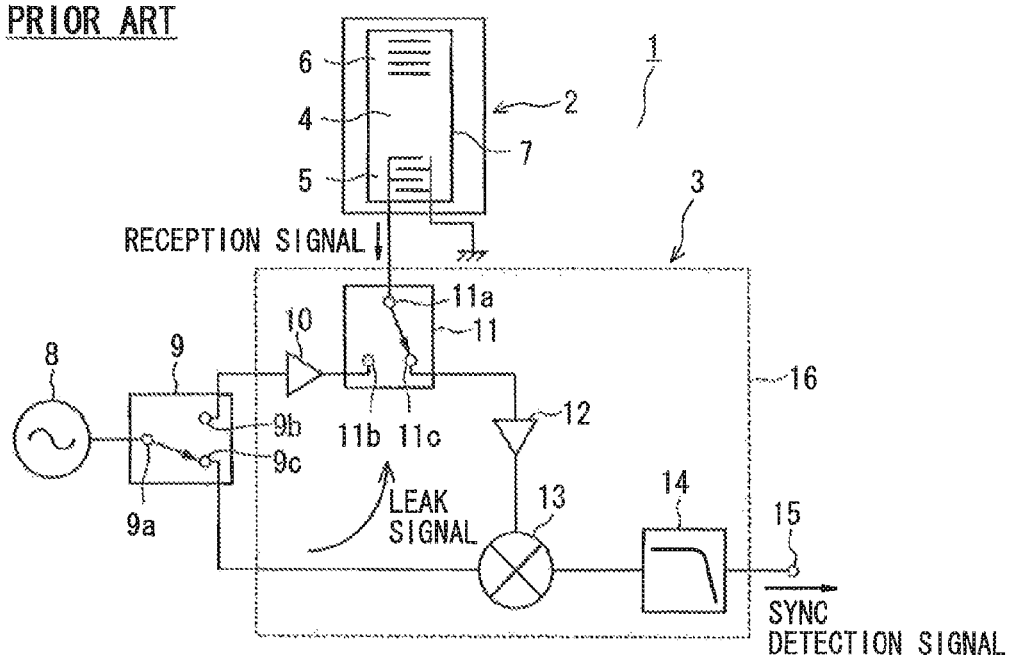
FIG. 15 is a functional block diagram of the conventional wireless remote sensing system observed when a reception signal is received.

A wireless remote sensing system 111 according to a sixth embodiment of the present disclosure is described below with reference to FIG. 13. A difference between the third embodiment and the sixth embodiment is as follows.

The difference between the third embodiment and the sixth embodiment is similar to the difference between the first embodiment and the fourth embodiment and the difference between the second embodiment and the fifth embodiment. Specifically, the wireless remote sensing system 111 includes the SAW sensor 72 of the third embodiment and a sensing apparatus 112. A difference between the sensing apparatus 112 and the sensing apparatus 73 of the third embodiment is that the sensing apparatus 112 does not have the phase shifter 40. In the sensing apparatus 112, the other elements except the phase shifter 40 are implemented on one chip of a silicon substrate 93.

The sensing apparatus 112 includes a SAW delay element 113 instead of the SAW delay element 83. The SAW delay element 113 includes a piezoelectric substrate 114, a first input electrode 115, a first output electrode 116, a second input electrode 117, and a second output electrode 118. The first input electrode 115, the first output electrode 116, the second input electrode 117, and the second output electrode 118 are formed on the piezoelectric substrate 114. A difference between a distance from the first input electrode 115 to the first output electrode 116 and a distance from the second input electrode 117 to the second output electrode 118 corresponds to a phase delay of 90 degrees of the transmission signal. The SAW delay element 113 is designed so that each of a surface acoustic wave having the same frequency as the reflection frequency fa of the first SAW reflector 77 and a surface acoustic wave having the same frequency as the reflection frequency fb of the second SAW reflector 81 can pass through the SAW delay element 113.

As described above, according to the sixth embodiment, the difference between the distance from the first input electrode 115 to the first output electrode 116 and the distance from the second input electrode 117 to the second output electrode 118 corresponds to the phase delay of 90 degrees of the transmission signal. Thus, in quadrature detection, the phase shift of the surface acoustic wave can be performed in the SAW delay element 113 without using the phase shifter 40 for performing the phase shift of the transmission signal inputted to the SAW delay element 113. Thus, the phase shifter 40 can be removed so that circuit size can be reduced. Further, the phase delay amount can be accurately controlled.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

For example, a configuration for the phase shift such as the phase shifter 40 can be omitted when quadrature detection is not performed.

The reflection frequency of the SAW reflector is not limited to 200 [MHz] or 210 [MHz].

The semiconductor substrate is not limited to a silicon substrate.

In the second embodiment, three or more different delay times can be set.

In the third embodiment, three or more different reflection frequencies can be set.

In the fourth, five, and sixth embodiments, the first output electrode and the second input electrode can be misaligned (i.e., output side ends for outputting the surface acoustic wave can be misaligned) so that the difference between the distance from the first input electrode to the first output electrode and the distance from the second input electrode to the second output electrode corresponds to the phase delay of 90 degrees of the transmission signal.

What is claimed is:

1. A wireless remote sensing system comprising;
   a carrier wave generator configured to generate a carrier wave of a predetermined frequency;
   a first switch configured to switch between an ON state and an OFF state, the ON state allowing the first switch to generate a transmission signal of the predetermined frequency by pulse modulating the carrier wave received from the carrier wave generator;
   a surface acoustic wave sensor having a predetermined delay time and configured to receive the transmission signal of the predetermined frequency, the surface acoustic wave sensor outputting and transmitting a reception signal of the predetermined frequency after the delay time has elapsed from receipt of the transmission signal;
   a second switch configured to switch between an input state and an output state, the input state allowing the second switch to receive the transmission signal from the first switch in the ON state and to transmit the transmission signal to the surface acoustic wave sensor, the output state allowing the second switch to receive the reception signal from the surface acoustic wave sensor and to output the reception signal;
   a surface acoustic wave delay element having the same delay time as the surface acoustic wave sensor and including an input electrode for receiving the transmission signal from the first switch in the ON state and an output electrode for receiving a surface acoustic wave from the input electrode, the surface acoustic wave delay element configured to output a local signal of the predetermined frequency from the output electrode after the delay time has elapsed from receipt of the transmission signal by the input electrode, and
   a mixer configured to receive the reception signal from the second switch and the local signal from the surface acoustic wave delay element, the mixer configured to generate a synchronous detection signal by mixing the reception signal and the local signal, wherein
   the second switch and the mixer are implemented on one chip of a semiconductor substrate,
   during a period of time when the second switch remains in the input state, the first switch switches from the OFF state to the ON state and then switches back to the OFF state, and
   the second switch switches from the input state to the output state before the delay time has elapsed after the first switch switches back to the OFF state.

2. The wireless remote sensing system according to claim 1, wherein
   the surface acoustic wave sensor has a plurality of predetermined delay times including a first delay time and a second delay time,
   the surface acoustic wave sensor outputs a first reception signal after the first delay time has elapsed from receipt of the transmission signal of the predetermined frequency,
   the surface acoustic wave sensor outputs a second reception signal after the second delay time has elapsed from receipt of the transmission signal of the predetermined frequency,
   the surface acoustic wave delay element has the same plurality of delay times as the surface acoustic wave sensor,
   the surface acoustic wave delay element has a plurality of output electrodes including a first output electrode and a second output electrode,
   the surface acoustic wave delay element outputs a first local signal from the first output electrode after the first delay time has elapsed from receipt of the transmission signal from the first switch in the ON state by the input electrode,
   the surface acoustic wave delay element outputs a second local signal from the second output electrode after the second delay time has elapsed from receipt of the transmission signal from the first switch in the ON state by the input electrode, and
   the mixer generates a first synchronous detection signal by mixing the first reception signal and the first local signal and generates a second synchronous detection signal by mixing the second reception signal and the second local signal.

3. The wireless remote sensing system according to claim 1, wherein
   the surface acoustic wave sensor receives the transmission signal of a plurality of frequencies including a first frequency and a second frequency,
   the surface acoustic wave sensor outputs the reception signal of the first frequency after the delay time has elapsed from receipt of the transmission signal of the first frequency,
   the surface acoustic wave sensor outputs the reception signal of the second frequency after the delay time has elapsed from receipt of the transmission signal of the second frequency,
   the surface acoustic wave delay element outputs a local signal of the first frequency from the output electrode after the delay time has elapsed from receipt of the transmission signal of the first frequency from the first switch in the ON state by the input electrode, the surface acoustic wave delay element outputs a local signal of the second frequency from the output electrode after the delay time has elapsed from receipt of the transmission signal of the second frequency from the first switch in the ON state by the input electrode, and the mixer generates a first synchronous detection signal by mixing the reception signal of the first frequency and the local signal of the first frequency and generates a second synchronous detection signal by mixing the reception signal of the second frequency and the second local signal of the second frequency.

4. The wireless remote sensing system according to claim 1, wherein the input electrode of the surface acoustic wave delay element comprises a first input electrode and a second input electrode, the output electrode of the surface acoustic wave delay element comprises a first output electrode for receiving the surface acoustic wave from the first input electrode and a second output electrode for receiving the surface acoustic wave from the second input electrode, and a difference between a first distance from the first input electrode to the first output electrode and a second distance from the second input electrode to the second output electrode corresponds to a phase delay of 90 degrees of the transmission signal.

5. The wireless remote sensing system according to claim 2, wherein the input electrode of the surface acoustic wave delay element comprises a first input electrode and a second input electrode, the output electrode of the surface acoustic wave delay element comprises a first output electrode for receiving the surface acoustic wave from the first input electrode and a second output electrode for receiving the surface acoustic wave from the second input electrode, and a difference between a first distance from the first input electrode to the first output electrode and a second distance from the second input electrode to the second output electrode corresponds to a phase delay of 90 degrees of the transmission signal.

6. The wireless remote sensing system according to claim 3, wherein the input electrode of the surface acoustic wave delay element comprises a first input electrode and a second input electrode, the output electrode of the surface acoustic wave delay element comprises a first output electrode for receiving the surface acoustic wave from the first input electrode and a second output electrode for receiving the surface acoustic wave from the second input electrode, and a difference between a first distance from the first input electrode to the first output electrode and a second distance from the second input electrode to the second output electrode corresponds to a phase delay of 90 degrees of the transmission signal.

* * * * *